United States Patent [19]
Blanchette et al.

[11] 3,939,734
[45] Feb. 24, 1976

[54] AUTOMATIC TRANSMISSION WITH CENTRIFUGAL CLUTCHES

[76] Inventors: Henri Blanchette, 99 Haudel, Candiac, Quebec; Gerard Belanger, 543 de la Verendrye, Boucherville, Quebec, both of Canada

[22] Filed: Apr. 11, 1974

[21] Appl. No.: 460,204

[30] Foreign Application Priority Data
Feb. 12, 1974 Canada.................................. 192454

[52] U.S. Cl. ......... 74/752 E; 192/103 R; 192/105 B
[51] Int. Cl.² F16H 3/74; F16D 43/06; F16D 43/24
[58] Field of Search. 74/752 E; 192/103 B, 105 BA, 192/3.51, 3.52, .03, .033, 3.61, 103 R, 103 A, 105 B, 54

[56] References Cited
UNITED STATES PATENTS

| | | | |
|---|---|---|---|
| 2,246,996 | 6/1941 | Kreis | 74/752 E X |
| 2,257,333 | 9/1941 | Cotterman | 74/752 E |
| 2,312,889 | 3/1943 | Everts | 192/103 B |
| 2,597,854 | 5/1952 | Cross et al. | 74/752 E |
| 2,662,692 | 1/1953 | Sloan | 192/54 X |
| 2,891,421 | 6/1959 | Grattan | 74/752 E |
| 3,204,737 | 9/1965 | Anner | 192/105 BA |
| 3,519,112 | 7/1970 | Verzolla | 192/103 B X |
| 3,675,750 | 7/1972 | Wright | 192/103 B X |
| 3,702,084 | 11/1972 | Kepple et al. | 74/752 E |
| 3,768,337 | 10/1973 | Racicot | 74/752 E |
| 3,797,331 | 3/1974 | Kjeldsteen | 74/752 E |

*Primary Examiner*—Samuel Scott
*Assistant Examiner*—Lance W. Chandler
*Attorney, Agent, or Firm*—Cushman, Darby & Cushman

[57] ABSTRACT

The disclosure herein is concerned with an automatic transmission in which rotation of an input shaft engages a first centrifugal clutch assembly which, in turn, drives reduction planetary gears and, as the input speed picks up, a second centrifugal clutch assembly comes into play whereby the entire system between the input and output shafts rotates as a unit. The clutch assembly consists of an extensible roller bearing provided with a series of circumferentially spaced openings in which are received roller weights arranged in pair and in contacting engagement with adjacent surfaces of pressure discs which, together with co-acting clutch discs, also form part of the clutch assembly. In one embodiment of the invention, the planetary gear assembly is located between the first and second centrifugal clutch assembly; in a second embodiment, the second centrifugal clutch assembly is located between the first centrifugal clutch assembly and the planetary gear assembly; and in a third embodiment, the location of the planetary gear assembly is similar to that of the second embodiment, but only one extensible roller bearing is used for the engagement of both centrifugal clutch assemblies.

20 Claims, 5 Drawing Figures

AUTOMATIC TRANSMISSION WITH CENTRIFUGAL CLUTCHES

FIELD OF THE INVENTION

The present invention relates to an automatic transmission; more particularly, the invention describes a transmission for producing a variable speed drive to light-weight vehicles, such as snowmobiles, motorbikes and the like.

BACKGROUND OF THE INVENTION

Presently known automatic transmissions provided on such type of light-weight vehicles are composed of a variable speed drive including a drive pulley and a driven pulley, each pulley consisting of movable flanges on which a transmission belt is mounted; these pulleys have a variable effective diameter responsive to the speed of rotation, the effective diameter increasing with an increase in speed.

In such transmission system, there are several disadvantages. First, an intermediate support is usually provided for the driven pulley resulting in additional space being required on the small vehicle. Also, under certain atmospheric conditions which cause the formation of frost on the pulley flanges and on the transmission belt, the latter will slide over rather than engage the pulleys. Further, a small misalignment on the pulleys inevitably results in a premature wear of the transmission belt and a considerable loss of power.

STATEMENT OF THE INVENTION

It is an object of the present invention to provide an automatic transmission which overcomes the above described disadvantages in light-weight vehicles.

It is another object of the present invention to provide in light-weight vehicles a transmission system where the transmission belt and pulleys are substituted with a centrifugal clutch and planetary gear assembly which is more compact and which avoids loss of power when operating at high speed.

A further object of the present invention is to provide an automatic transmission which is light in weight, compact and economical of manufacture.

The present invention consists in an automatic transmission in which increased rotation of the input shaft causes the engagement of a first centrifugal clutch assembly which, in turn, drives a planetary gear reduction assembly and, as speed picks up, a second centrifugal clutch assembly of similar construction comes into engagement to change the drive of the input shaft to a direct drive arrangement with the output shaft whereby the whole transmission rotates as a unit.

The clutch assembly is characterized by an extensible roller bearing that includes a series of circumferentially spaced openings in which roller weight means are received and are in contacting engagement with adjacent surfaces of pressure discs which, together with co-acting clutch discs, also form part of the clutch assembly.

In one form of the invention, the planetary gear assembly is located between the first centrifugal clutch assembly and the second centrifugal clutch assembly.

In a second embodiment of the invention, the second centrifugal clutch assembly is located about the input drive shaft and disposed between the first centrifugal clutch assembly and the planetary gear assembly.

Yet, in another embodiment of the invention, the location of the planetary gear assembly is arranged similar to that of the second embodiment, but only one extensible roller bearing is used for the operation of both centrifugal clutch assemblies.

Other objects, purposes and characteristic features of the present invention will be, in part, obvious from the accompanying drawings, and, in part, pointed out as the description of the invention progresses. In describing the invention in detail, reference will be made to the accompanying drawings, in which like reference characters designate corresponding parts throught the several views.

SUMMARY OF THE DRAWINGS

FIG. 1, which consists of FIG. 1a and FIG. 1b, represents an exploded view (sequentially including sections A, B, C, D, and E) of a first embodiment of an automatic transmission made in accordance with the present invention;

DESCRIPTION OF A FIRST EMBODIMENT

Figure 1A:
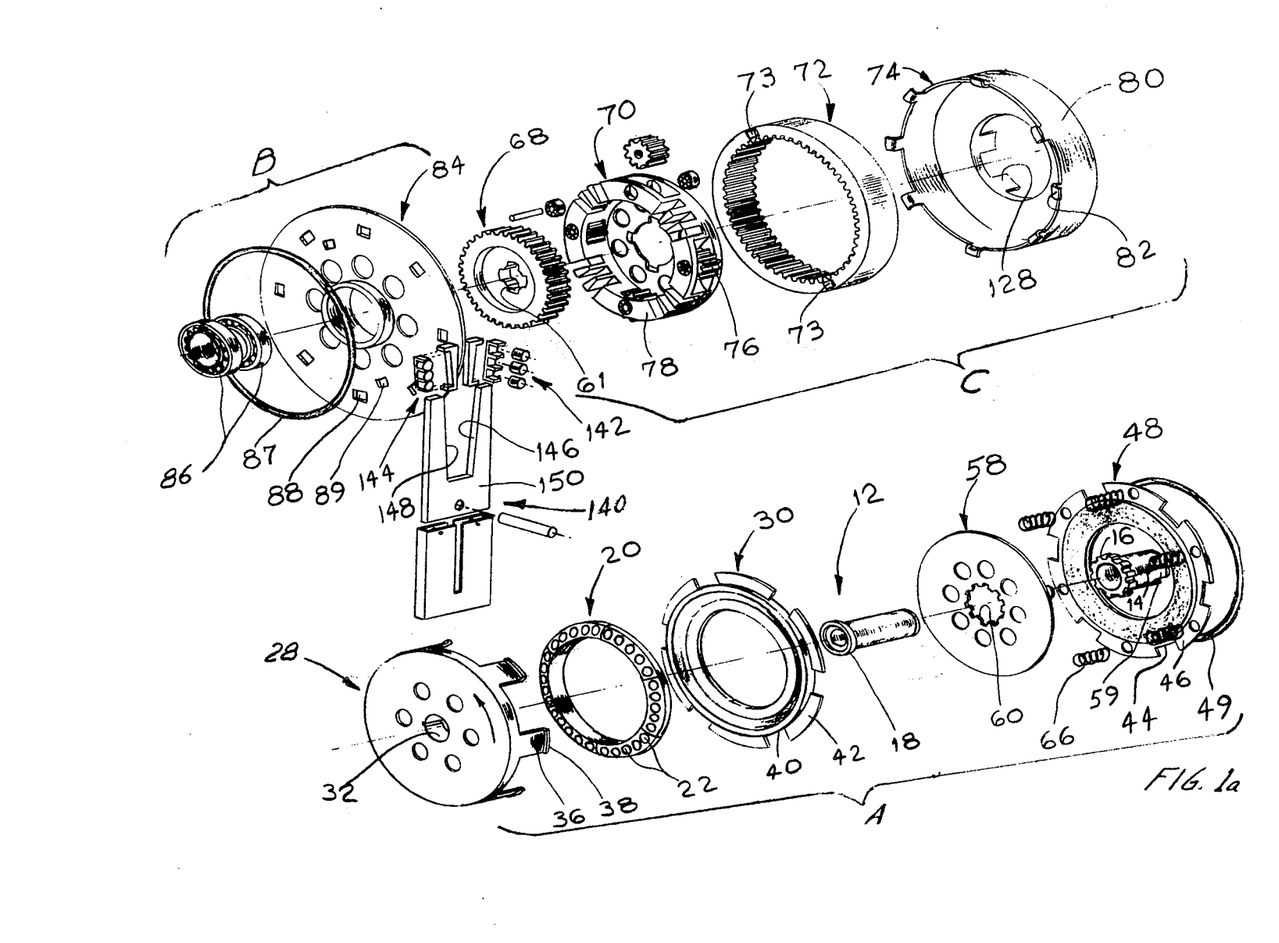
Figure 1B:
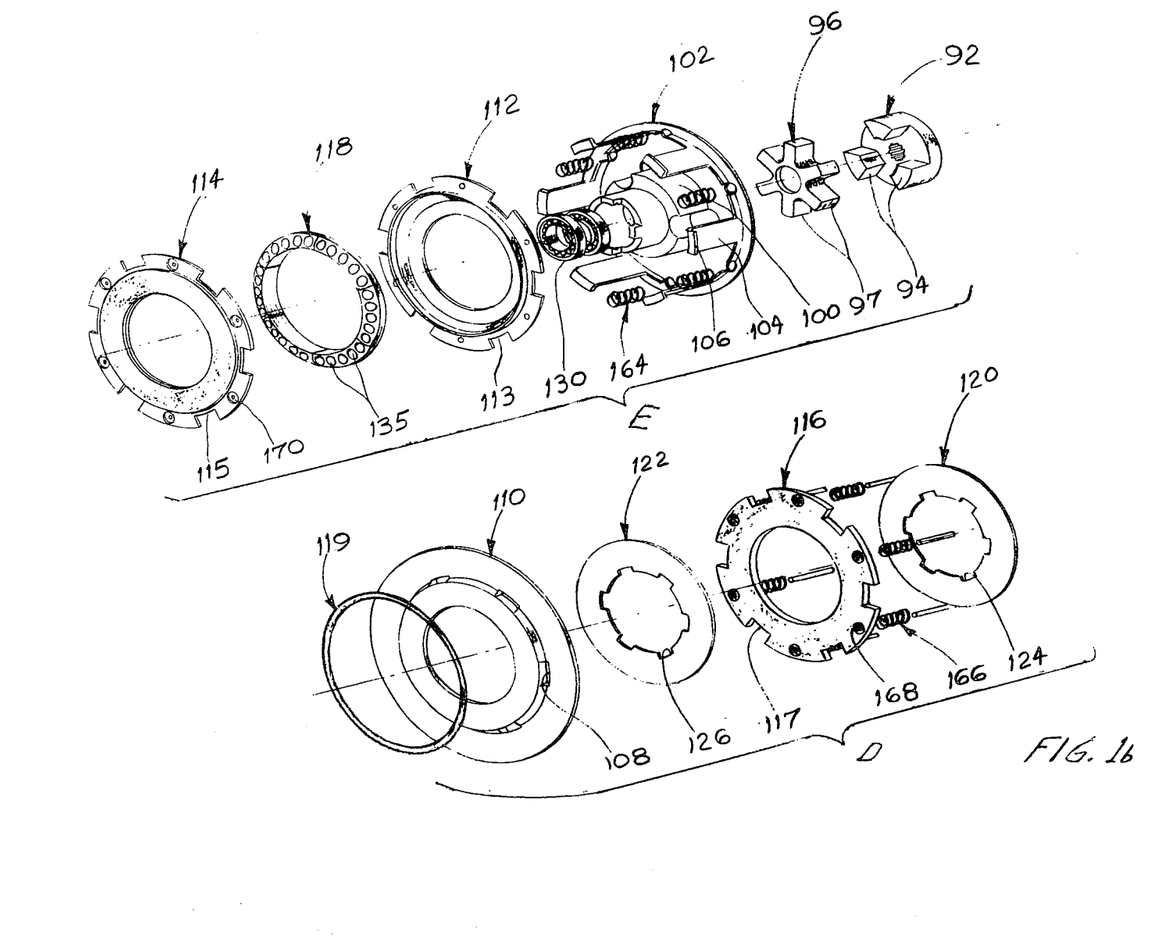
Figure 2:
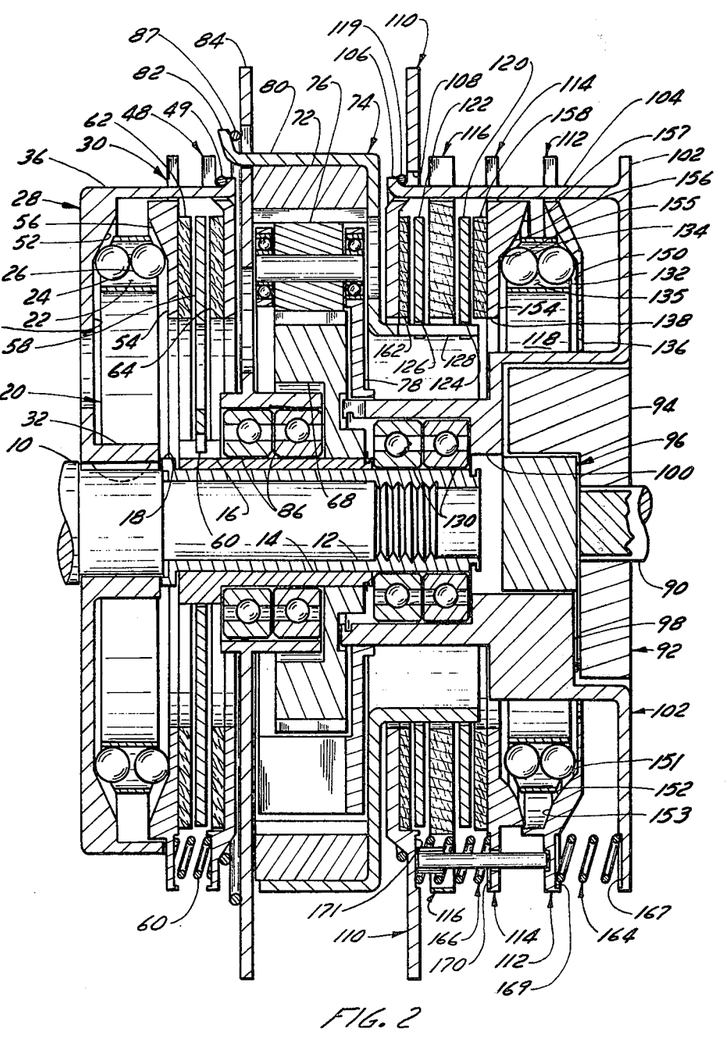
FIG. 2 is a cross-sectional view taken at 120° of the assembled automatic transmission of FIG. 1.

Referring to FIGS. 1 and 2 of the drawings, there is illustrated a first embodiment of an automatic transmission made in accordance with the present invention.

In FIG. 1: A designates generally the first centrifugal clutch assembly which comes into operation for low rotational speeds of input drive; B designates an overrun clutch unit; C designates a planetary gear reduction assembly; and D designates and E designate generally the second centrifugal clutch assembly for high rotational speeds of input drive.

The input or driving shaft 10 of a motor (not shown), for example the engine of a snowmobile or motorbike, is threadedly engaged with a sleeve 12 in coaxial alignment therewith. A second sleeve 14 is coaxially received over sleeve 12 and has a toothed flange 16 disposed adjacent the end flange 18 of sleeve 12.

A first extensible roller bearing 20 is mounted about the input shaft 10. This bearing 20 may be in the shape of a segmented ring provided with a series of circumferentially spaced openings 22 wherein a number of segments (six shown) are radially movable under the influence of centrifugal force. Roller weights, such as ball 24, 26, are arranged in pair in each opening 22.

The ball weights 24 and 26, together with bearing 20, are enclosed by pressure discs 28 and 30. In the embodiment illustrated, pressure disc 28 consists in the cover plate of the first centrifugal clutch assembly and has an inwardly extending central hub 32 which is suitably mounted to the input shaft 10 so as to be rotated thereby. The outer edge of the cover plate 28 includes a series of axially extending equally spaced flanges 36 with outwardly turned ends 38. These flanges 36 extend through correspondingly-shaped slots 40 on the peripheral edge 42 of the pressure disc 30. These flanges 36 also extend in similarly-shaped slots 44 provided in the peripheral edge 46 of a third pressure disc 48, the function of which will hereinafter be described. A spring wire 49 insures assembly of the pressure discs to the cover plate. Once assembled and supported on plate 28, pressure discs 30 and 48 are free to slide axially relative to the cover plate 28.

Each pressure disc 28, 30 is provided with side walls presenting surfaces to an adjacent ball weight 24, 26. The inner side wall of cover plate 28 includes a first radially extending face 50 followed by a slanted face 52 inwardly tapering toward the segmented ring 20. Similarly, one side wall of pressure disc 30 includes a first face 54 symmetrically opposed to face 50 and a second face 56 symmetrically opposed to slanted face 52 and slanted in opposite direction thereto. For a small input drive, the ball weights 24 and 26 remain in contact with their respective radial faces 50 and 54; as the rotational speed increases, the ball weights roll to slanted faces 52 and 56 under the action of centrifugal force resulting in the axial displacement (to the right in FIG. 2) of pressure disc 30.

Pressure discs 30 and 48 enclose a clutch disc 58 which has a toothed central hub 60 in meshing engagement with flange 16 of the sleeve 14. Pressure discs 30 and 48 respectively have annular facings 62 and 64 which are adapted to come in contact with opposite side walls of clutch disc 58. Pressure discs 30 and 48 are held away from contacting engagement with clutch disc 58 by means of a series of compressed coiled springs 66 circumferentially disposed at equally spaced intervals about the longitudinal axis of the assembly. Suitable seating recesses are provided in edges 42 and 46, respectively, of the pressure discs 30 and 48 to receive the ends of the coiled springs. Clutch disc 58 is operatively connected to the planetary gear assembly C by means of sleeve 14. At one end of sleeve 14, disc 58 is meshingly engaged with toothed portion 16 while, at the other end, projections 59 engage correspondly shaped recesses 61 in a sun gear 68.

The planetary gear assembly C includes a sun gear 68, planet gear means 70 and an outer gear ring 72, which gears are all mounted in a coupling member 74. The sun gear 68 is fixedly attached to the opposite end of the sleeve 14. The planet gear means 70 includes four planet gears 76 rotatably supported individually by a carrier 78, which is attached to the second centrifugal clutch assembly D (as described hereinbelow). The planet gears 76 are in meshing engagement with sun gear 68 and are evenly spaced apart circumferentially around the sun gear. The outer ring gear 72 extends around and meshingly engages the four planet gears 76. The coupling member 74 is attached to the outer ring gear 72 and is provided with a rim 80 with a series of circumferentially spaced coupling extensions 82.

The overrun clutch assembly B includes a disc 84 freely mounted on bearings 86 for rotation about sleeve 14. Disc 84 is provided with a series of circumferentially spaced openings 88 to receive therein the coupling extensions 82 of the rim 80 of coupling member 74. A spring wire 87 fixedly attaches members 80 and 84. Two additional openings 89 are provided on disc 84 to receive two correspondly shaped lugs 73 on one edge face of the outer ring gear 72 to ensure rotation of ring 72 in the same direction as disc 84. An unidirectional brake mechanism 140 is provided to allow disc 84 to rotate in only one direction; in FIG. 1, for a clockwise rotation of disc 84, the side edges of disc 84 are jammed between two roller carrying blocks 142 and 144 which are adapted to slide along tapering side walls 146 and 148 of plate member 150.

The second centrifugal clutch assembly D and D is mounted over an output or driven shaft 90 threadedly engaged to a toothed member 92. The teeth of member 92 are received in correspondingly-shaped recesses of a star-shaped coupling member 96. In FIG. 1, this coupling member is shown with six radially extending projections 97, three of which receive the three teeth of member 92 while the other alternate three engage three correspondingly shaped projections (not shown) which form part of the inner portion of hub 100 of a cover plate 102. This cover plate 102 has a series of axially extending flanges 104, each flange having a bent end 106 which is adapted to be received in corresponding opening 108 of pressure disc 110. Three other pressure discs 112, 114 and 116 are provided with a series of aligned peripheral recesses 113, 115 and 117, respectively, to receive the flanges 104 of the cover plate 102. The pressure discs are retained to the cover plate 102 by means of a spring wire 119. A second segmented ring 118, of similar construction to that of ring 20 of the first centrifugal clutch assembly A, is disposed between a pair of pressure discs 112 and 114 while a pair of clutch discs 120 and 122 are respectively disposed between pressure discs 114, 116 and 116 and 110. Clutch discs 120 and 122 are respectively bored with recesses 124, 126 to engagedly receive axial projections 128 on coupling member 74.

The cover plate 102 is adapted to freely rotate on sleeve 12 by means of bearings 130.

The segmented ring 118 includes a series of pairs of ball weights 132 and 134 provided in appropriate openings 135 and adapted to contact respectively the opposite sidewalls 136, 138 of the pressure discs 112 and 114. These sidewalls respectively include faces 150, 151, 152, 153 and 154, 155, 156, 157 along which ball weights 132 and 134 will roll under the action of centrifugal force. The pressure discs 114 and 110 are respectively provided with annular clutch facings 158 and 162 for their frictional contact engagement with the clutch discs 124 and 126.

A series of circumferentially spaced compressed coil springs 164 distance the cover plate 102 from the first pressure disc 112. A second series of circumferentially spaced compressed coil springs 166 distance pressure disc 114 from pressure disc 110, a series of openings 168 being provided through the peripheral edge of disc 116 to allow passage of springs 166. Suitable circular recesses 167, 169 and 170, 171 are provided on plate 102, and pressure discs 112, 114 and 110 to receive the opposite ends of the coil springs 164 and 166, respectively. The compression and number of springs 164, 166 will evidently vary in accordance with other specifications of the transmission, such as the slope of walls 150–156.

A series of circular openings are shown in FIG. 1 on parts 28, 58, 84 and 102 to allow air circulation inside the transmission for cooling purposes.

OPERATION OF THE FIRST EMBODIMENT

As input shaft 10 is driven by the motor, sleeve 12 and cover plate 28 are likewise rotated. Pressure discs 30 and 48 mounted to cover plate 28 are also rotated but are prevented from contacting the clutch disc 58 by the compression in the springs 66. When the rotational speed of the input shaft is sufficient for the pairs of ball weights 24 and 26 to move from the related adjacent radial faces 50 and 54 to slanted faces 52 and 56, an axial force is exerted on the pressure disc 30, against the action of the coil springs 66, whereby annular clutch facings 62 and 64 frictionally engage the respective side faces of the clutch disc 58. Clutch disc 58 being operatively connected to the planetary gear assembly C via sleeve 14, the sun gear rotates in the same direction as that of the clutch disc 58. Due to the load resistance at the output which is felt by the planet gear means 70, rotation of the sun gear 68 tends to have the outer ring gear 72 rotating in opposite direction thereto. However, the outer ring gear 72, through its connection to the overrun clutch 84 (lugs 73 are engaged in corresponding openings 89 of disc 84), is prevented from rotating in the opposite direction by the unidirectional brake mechanism 140. Hence, there results a rotation at low speed of carrier 78 and of the output shaft in the same direction as that of the input shaft.

As the speed of rotation of the output shaft further increases, the ball weights 132 and 134 of the second segmented ring 118, under the action of the centrifugal force, roll along retaining walls 151 and 155, and along walls 152 and 156 working against the compression action of springs 166, and then along walls 153 and 157 against the compression action of springs 164. There results a frictional engagement of pressure discs 114, 116, 110 with corresponding clutch discs 120, 122. Coupling member 74 is urged in the same rotational direction by the engagement of clutch discs 120, 122. Hence, the overrun clutch disc 84 is urged to rotate likewise and its rotation in that direction is allowed when its edge is freed from the wedging action of blocks 142 and 144 which then roll up slopes 146 and 148. The input drive is thus changed to a direct transmission to the output shaft and the entire transmission structure rotates similarly as a unit.

When the rotational speed of the motor is decreased, a reverse operation to that described above is performed whereby the engagement of the pressure discs of the second centrifugal assembly is relieved from their contacting engagement with associated clutch discs as a result of the ball weights of the second segmented ring rolling down slopes 157-156-155-154 and 153-152-151-150 and of the coil springs distancing the pressure discs. The rotation of coupling 74 and outer ring gear 72 is stopped and ring gear 72 is prevented by the brake mechanism 140 from rotating in opposite direction to that of the input shaft. Also, as the input drive decreases, the ball weights roll down slopes 52, 56 and clutch disc is disengaged.

It is to be noted that the motor can be used as a braking mechanism in high speed when the automatic transmission forms a single revolving unit. In cases where the transmission operates in low speed, a sudden speed decrease of the motor can provoke a free rotation of the ring gear 74 in the rotational direction of the input drive thereby resulting in an automatic declutching action.

DESCRIPTION OF SECOND EMBODIMENT

Figure 3:
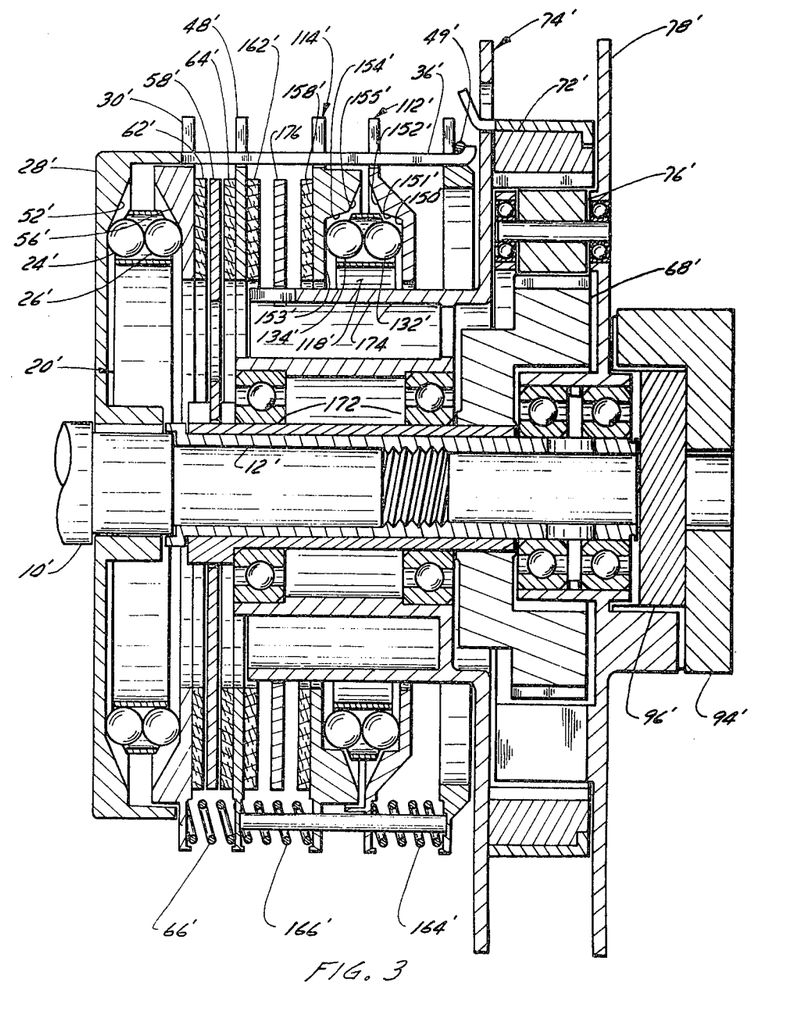
FIG. 3 is a similar cross-sectional view of an automatic transmission showing a second embodiment of the present invention.

In FIG. 3, is shown a modification with an alternate form of an automatic transmission wherein the second centrifugal clutch assembly is located between the first centrifugal clutch assembly and the planetary gear assembly.

A description of those parts which are identical or similar to those described in connection with the first embodiment illustrated in FIGS. 1 and 2 will not be repeated, however, these parts, when referred to, will receive a reference numeral identical to corresponding parts of FIGS. 1 and 2 with the addition of a prime mark. Reference should be made to the foregoing paragraphs with the following description to arrive at a complete understanding of this second embodiment.

The flanges 36' of the cover 28' have been extended to include the second centrifugal clutch assembly. Coupling member 74' is structured somewhat differently from coupling member 74 of the first embodiment in that it is adapted, by means of roller bearing means 172, to freely rotate about the input shaft 10'. This coupling member 74' also includes an extension 174 on which is mounted for rotation the clutch disc 176. In this embodiment, the brake mechanism (not shown) is adapted to operate directly on the member 74'. The cooperating opposite faces 151', 154' of the second centrifugal clutch assembly form with their adjacent radial faces 150', 153' to serve as a retaining wall and to prevent early separation of the pressure discs 112' and 114' for low input speeds of the shaft 10'. Also, the separation between clutch disc 176 and the adjacent clutch facings 158' and 162' is greater than the separation between clutch disc 58' and the adjacent clutch facings 62' and 64' of the pressure discs 30' and 48', respectively.

OPERATION OF THE SECOND EMBODIMENT

As the input shaft 10' begins rotation, the segmented rings 20' and 118' also begin rotation. As the rotational speed increases, the centrifugal force causes an outward movement of the roller means 24', 26' and 132', 134' on their respective contacting surfaces. Since the slope of the faces 52' and 56' is smaller than that of faces 151' and 154', pressure disc 30' only is axially displaced to engage with disc 48', the clutch disc 58'. Hence, the sun gear 68' begins to rotate in the same direction as the input shaft but, since the planetary gear system 76' is operatively connected to the output shaft through members 94' and 96', the outer ring gear 72' is urged to rotate in a direction opposite to that of the input shaft. However, as explained above, the outer ring gear 72' and coupling member 74' attached thereto are prevented from rotation in the opposite direction by an unidirectional brake mechanism (not shown) and the planetary gear assembly 76' rotates in the direction of rotation of the input shaft. As the speed of the input shaft 10' further increases, the ball weights 132' and 134' leave faces 150'-151', 153'-154' to roll up inclined faces 152' and 155' causing pressure disc 114' to engage, with pressure disc 48', the clutch disc 176. The coupling member 74' thus rotates in the same direction as that of the input shaft and the whole assembly is a direct drive from input to output.

The declutching operation is basically similar to that described above with respect to FIGS. 1 and 2.

The rotational speed of the ball weights of the second centrifugal clutch assembly is brought to the maximum speed of revolution of the motor when passing into second speed. These characteristics of the second embodiment provide more latitude in the selection of speed when passing into second speed and when returning into first speed. Further, the precision in the face angles of the pressure discs 112' and 114' is less critical as well is the precision in the manufacturing of springs 164' and 166'.

DESCRIPTION OF THIRD EMBODIMENT OF THE INVENTION

Figure 4:
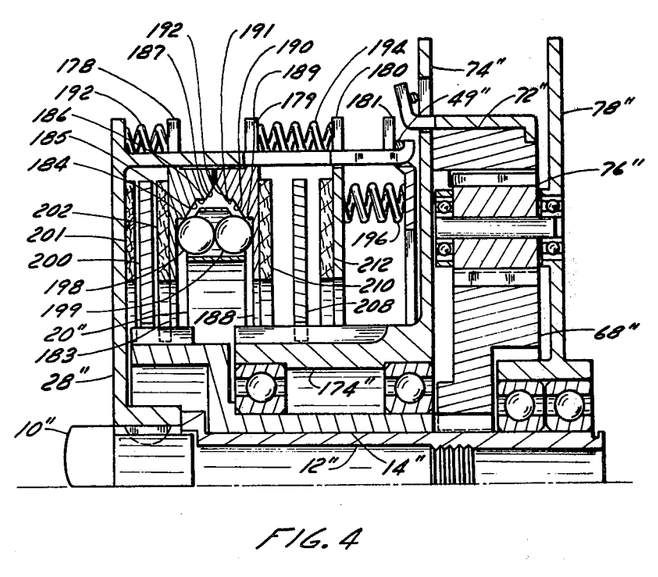
FIG. 4 is a similar, but half, cross-sectional view of an automatic transmission showing a third embodiment of the present invention.

In FIG. 4 is shown another modification with an alternative form of the automatic transmission wherein the second centrifugal clutch assembly is mounted about the input shaft and located between the first centrifugal clutch assembly and the planetary gear assembly. However, in this embodiment, only one segmented ring is used for both first and second speeds.

A description of those parts which are identical or similar to those described above in connection with the two embodiments illustrated in FIGS. 1, 2 and 3 will not be repeated; however, these parts, when referred to, will receive a reference numeral identical to corresponding parts of FIGS. 1–3 with the addition of a double prime mark. Reference should therefore be made to the foregoing paragraphs together with the following for a complete understanding of this third embodiment.

In the present embodiment, the centrifugal force acts on one segmented ring 20''. Hence, in a first action, the segmented ring 20'' will actuate the first centrifugal clutch assembly and, as the rotational speed of the input shaft increases, will actuate the second centrifugal clutch assembly. Ring 20'' is enclosed by two pressure discs 178, 179, respectively provided with opposite sidewalls having a series of faces 183, 184, 185, 186, 197 and 188, 189, 190, 191, 192. A first clutch disc 200 is situated between cover plate facing 201 and pressure disc facing 202 while a second clutch disc 208 is located between facings 210 and 212 of further pressure discs 179 and 180. A fourth pressure disc 181 is mounted to the cover plate 28'' and held thereon by means of a spring wire 49''. A series of compressed coil springs 192, 194, 196 are respectively provided between pressure disc 178 and cover plate 28'', pressure discs 179–180, and pressure discs 180–181. The number and compression value of these springs will vary in accordance with predetermined specifications to be given for the transmission device.

OPERATION OF THIRD EMBODIMENT

As the input shaft 10'' begins to rotate, the cover plate 28'' and sleeve 12'' rotate likewise, resulting in the rotation of pressure discs 178, 179, 180 and 181. At idle speed, these pressure discs are respectively held away from each other by the compressed coil springs 192, 194 and 196. As the rotational speed of the input shaft further increases, ball weights 198 and 199 which are in contact with faces 183–184, 188–189 respectively, roll on faces 185, 190 thereby displacing pressure disc 178 to contact clutch disc 200. Rotation of the clutch disc 200 results in the rotation of the sun gear 68'' through sleeve 14''. The operation of the planetary gear assembly and the output shaft is similar to that of FIGS. 1 to 3, coupling member 74'' being prevented from rotation in a direction opposite to that of the input shaft by means of an unidirectional brake mechanism such as the one shown in FIG. 1.

As the speed of rotation of the input shaft 10'' further increases, the ball weights 198 and 199 are further urged outwardly and leave faces 185, 186 and 190, 191 with which they are in contact to roll on faces 187 and 192. There, pressure disc 179 is axially displaced against the action of springs 194 and seizes clutch disc 208 with the assistance of pressure disc 180.

The declutching operation is similar to that described above in relation to the first and second embodiments; the disengagement of the pressure discs on their respective clutch discs is caused by the decreasing of the centrifugal force on the ball weights and the returning action of the different coil springs on the pressure discs.

Although the invention has been described above in relation to three specific forms of the invention, it would be evident to the man skilled in the art that it may be refined and modified in various ways. It is therefore wished to have it understood that the present invention is not limited in interpretation excepts by the terms of the following claims.

What we claim is:

1. In an automatic transmission: an input shaft; extensible roller bearing means mounted about the longitudinal axis of said input shaft and carrying radially movable centrifugal roller means; pressure disc means enclosing said bearing means and having surface presenting means for contacting engagement with said roller means, at least one of said pressure disc means being axially displaceable under the influence of a first predetermined centrifugal force on said roller means; first clutch disc means disposed adjacent said one of said pressure disc means and adapted to be frictionally contacted by said one of said pressure disc means when axially displaced; a planetary gear assembly including a sun gear, planet gear means and an outer ring gear, said sun gear being operatively connected to said first clutch disc means; means to prevent rotation of said outer ring gear in a direction opposite to that of said sun gear; an output shaft operatively connected to said planet gear means and in axial alignment with said input shaft; second clutch disc means disposed adjacent another of said pressure disc means; said other of said pressure disc means being axially displaceable under the influence of a second centrifugal force on said ring means and adapted to frictionally engage said second clutch disc means, said second clutch disc means being operatively connected to said outer ring gear; the size of said gear means of said planetary assembly being such as to provide a reduction in rotational speed between said input shaft and said output shaft for a low rotational speed of said input shaft; said surface presenting means on said one of said pressure disc means including a radially extending face in contacting engagement with said roller means for idle speeds of said input shaft and a first inclined face to receive pressure from said roller means for increased rotational speeds of said input shaft causing said one of said pressure disc means to engagedly contact said first clutch disc means; said other of said pressure disc means including a second inclined face to receive pressure from said roller means for further increased rotational speeds of said input shaft causing said other pressure disc means to engagedly contact said second clutch disc means whereby a direct drive is obtained between input and output shafts.

2. In an automatic transmission as defined in claim 1, said bearing means consisting of a segmented ring having a series of circumferentially disposed openings, said roller means including roller weights arranged in pair and received in said openings.

3. In an automatic transmission, in combination: an input shaft; a first extensible roller bearing means mounted about said input shaft and carrying radially movable centrifugal roller means; first pressure disc means disposed adjacent said first bearing means and having surface presenting means for contacting engagement with said roller means, at least one of said pressure disc means being axially displaceable relative to said input shaft under the influence of a first centrifugal force on said roller means; first clutch disc means disposed adjacent said one axially displaceable pressure disc means and adapted to be frictionally contacted by said axially displaceable pressure disc means; a planetary gear assembly including a sun gear, planet gear means and an outer ring gear, said sun gear being operatively connected to said first clutch disc means; means to prevent rotation of said outer ring gear in a direction opposite to that of said sun gear; an output shaft operatively connected to said planet gear means and in axial alignment with said input shaft; a second extensible roller bearing means carrying radially movable centrifugal roller means; second pressure disc means disposed adjacent said second bearing means and having surface presenting means for contacting engagement with said roller means of said second bearing means, at least one of said second pressure disc means being axially displaceable under the influence of a second centrifugal force on said roller means of said second bearing means; and second clutch disc means disposed adjacent said axially displaceable disc means of said second pressure disc means and adapted to be frictionally contacted by said axially displaceable disc means of said second pressure disc means; the size of said gears of said planetary assembly being such as to provide a reduction in rotational speed between said input shaft and said output shaft for a low rotational speed of said input shaft; said surface presenting means on said first and second pressure disc means including a radially extending face in contacting engagement with associated roller means of said rings for idle speeds of said input shaft and a first inclined face to receive said associated roller means for increased rotational speeds of said input shaft; said surface presenting means of said second pressure disc means including a second inclined face to receive pressure from said roller means of said second bearing means for further increased rotational speeds of said input shaft causing axially displaceable disc means of said second pressure means to engagedly contact said second clutch disc means whereby a direct rotational drive is obtained between input and output shafts.

4. In an automatic transmission as defined in claim 3, each of said first and second bearing means consisting of a segmented ring having a series of circumferentially disposed openings, said roller means consisting of roller weights arranged in pair in each of said openings.

5. In an automatic transmission as defined in claim 3, said first pressure disc means including a first cover plate fixed to said input shaft, said first segmented ring being enclosed between said cover plate and said axially displaceable disc means of said first pressure disc means; a further pressure disc being supported on said cover plate; said first clutch disc means being disposed between said further pressure disc means and said axially displaceable disc means of said first pressure disc means.

6. In an automatic transmission as defined in claim 5, circumferentially spaced resilient means being disposed between said further pressure disc and said axially displaceable disc means of said first pressure disc means to oppose engagement therebetween below a predetermined rotational speed of said input shaft.

7. In an automatic transmission as defined in claim 6, a second cover plate operatively connected to said output shaft; said second pressure disc means including a pair of axially displaceable discs supported on said second cover plate and enclosing said second segmented ring and one fixed pressure disc mounted to said second cover plate; said second clutch disc means including a pair of clutch discs operatively connected to said outer ring gear; said pair of clutch discs being intermediately disposed between said one fixed pressure disc and one of said pair of axially displaceable discs.

8. In an automatic transmission as defined in claim 7, a first series of circumferentially spaced resilient means being disposed between said one fixed pressure disc and one of said axially displaceable disc, and a second series of circumferentially spaced resilient means being disposed between the other of said axially displaceable disc and said second cover plate so that a constant pressure is applied on the clutch discs when engaged whatever is the speed of rotation.

9. In an automatic transmission as defined in claim 8, wherein said first cover plate, said first clutch disc means, said planet gear means and said second cover plate include openings for allowing air circulation through said transmission.

10. In an automatic transmission as defined in claim 6, said second segmented ring, said second pressure disc means and said second clutch disc means being mounted about said input shaft between said planetary gear assembly and said further pressure disc; said second pressure disc means including two axially displaceable discs supported on said first cover plate and enclosing said second segmented ring; said second clutch disc means being operatively connected to said outer ring gear; said second clutch disc means being disposed between said further pressure disc of said first pressure disc means and one of said axially displaceable discs of said second pressure disc means.

11. In an automatic transmission as defined in claim 10, a first series of circumferentially spaced resilient means disposed between said one of said axially displaceable discs of said second pressure disc means and said further pressure disc of said first pressure disc means; a second series of circumferentially spaced resilient means disposed between the other of said axially displaceable discs of said second pressure disc means and a pressure disc fixed to said cover plate at one end thereof.

12. In an automatic transmission as defined in claim 11, wherein said first cover plate, said first clutch disc means and said planet gear means include openings for allowing air circulation through said transmission.

13. In an automatic transmission: an input shaft; an extensible roller bearing means mounted about said input shaft and carrying radially movable centrifugal roller means; a pair of pressure disc means enclosing said bearing means and having surface presenting means for contacting engagement with said roller means, said pressure disc means being axially displaceable relative to said input shaft under the influence of first predetermined centrifugal force of said roller means; first clutch disc means disposed adjacent one of said pressure disc means and adapted to be frictionally contacted by said one pressure disc means when axially displaced; a planetary gear assembly including a sun gear, planet gear means and an outer ring gear, said sun gear being operatively connected to said first clutch disc means; means to prevent rotation of said outer ring gear in a direction opposite to that of said sun gear; an output shaft operatively connected to said planet gear means and in axial alignment with said input shaft; second clutch disc means disposed adjacent the other of said pressure disc means; said other pressure disc means being axially displaceable under the influence of a second predetermined centrifugal force on said bearing means and adapted to frictionally engage said second clutch disc means; said second clutch disc means being operatively connected to said outer ring gear; the size of said gear means of said planetary assembly being such as to provide a reduction in rotational speed between said input shaft and said output shaft for a low rotational speed of said input shaft; each of said surface presenting means of said pressure disc means including: a radially extending face in contacting engagement with said roller means for idle speed of said input shaft, a first inclined face to receive pressure from said roller means for increased rotational speeds of said input shaft causing said one pressure disc means to engagedly contact said first clutch disc means, and a second inclined face to receive pressure from said roller means for further increased rotational speeds of said input shaft causing said other pressure disc means to engagedly contact said second clutch disc means whereby a direct drive is obtained between input and output shafts.

14. In an automatic transmission as defined in claim 13, said bearing means consisting of a segmented ring having a series of circumferentially disposed openings, said roller means including roller weights arranged in pair and received in said openings.

15. In an automatic transmission as defined in claim 14, the separation of said first clutch disc means with said one pressure disc means is smaller than the distance separating the second clutch disc means and said other pressure disc means.

16. In an automatic transmission as defined in claim 15, a cover plate fixedly mounted on said input shaft and supporting said pressure discs means; a third pressure disc means mounted axially on said input shaft and supported by said cover plate; said third pressure disc means being mounted to engagedly contact said second clutch disc means.

17. In an automatic transmission as defined in claim 16, a first series of circumferentially spaced resilient means disposed between said one pressure disc means and the inner face of said cover plate; a second series of circumferentially spaced resilient means disposed between said other pressure disc means and said third pressure disc means.

18. In an automatic transmission as defined in claim 17, a third series of circumferentially spaced resilient means disposed between said third pressure disc means and a fourth disc supported axially over said input shaft by said cover plate.

19. In an automatic transmission as defined in claim 18, wherein said cover plate, said first clutch disc means and said planet gear means include openings for allowing air circulation through said transmission.

20. In an automatic transmission as defined in claim 19, wire spring means for securing said pressure disc means to said cover plate.

* * * * *